US007227545B2

(12) United States Patent
Maillot et al.

(10) Patent No.: US 7,227,545 B2
(45) Date of Patent: Jun. 5, 2007

(54) UNIFIED SUBDIVISION SCHEME FOR POLYGONAL MODELING

(75) Inventors: Jerome Maillot, Toronto (CA); Jos Stam, Seattle, WA (US)

(73) Assignee: Autodesk, Inc., San Rafael, CA (US)

( * ) Notice: Subject to any disclaimer, the term of this patent is extended or adjusted under 35 U.S.C. 154(b) by 147 days.

(21) Appl. No.: 10/153,888

(22) Filed: May 24, 2002

(65) Prior Publication Data
US 2003/0218609 A1 Nov. 27, 2003

(51) Int. Cl.
*G06T 17/20* (2006.01)
(52) U.S. Cl. ............... 345/423; 345/428; 345/581; 345/582; 345/647
(58) Field of Classification Search ........ 345/423, 345/441, 419, 428, 581, 647, 582
See application file for complete search history.

(56) References Cited

U.S. PATENT DOCUMENTS 5,506,947 A * 4/1996 Taubin ................ 345/441
6,130,673 A * 10/2000 Pulli et al. ............ 345/428
6,489,960 B2 * 12/2002 DeRose et al. ........... 345/423
6,587,105 B1 * 7/2003 Stam ..................... 345/423
6,738,062 B1 * 5/2004 Moreton ................. 345/423
6,806,874 B2 * 10/2004 Biermann et al. ........ 345/420

OTHER PUBLICATIONS

Bolz et al. "Rapid Evaluation of Catmull-Clark Surfaces", ACM, Feb. 2002.*
Biermann et al. "Piecewise Smooth Subdivision Surfaces with Normal Control", ACM 2000.*
Jos Stam, "On Subdivision Schemes Generalizing Uniform B-spline Surfaces of Arbitrary Degree."
Jerome Maillot, et al., "A Unified Subdivision Scheme for Polygonal Modeling" EUROGRAPHICS, vol. 20, No. 3, 2001.

* cited by examiner

*Primary Examiner*—Kimbinh T. Nguyen
(74) *Attorney, Agent, or Firm*—Staas & Halsey LLP

(57) ABSTRACT

A method, computer readable storage, and apparatus for improving subdivision schemes for subdivision surfaces. The present method can correct distortion from the base mesh caused by prior art subdivision and smoothing schemes. In one embodiment, the method includes: (a) subdividing a curve having original vertices producing additional vertices; (b) smoothing the curve into smoothed vertices comprising smoothed original vertices and smoothed additional vertices; and (c) adjusting positions of the smoothed vertices.

27 Claims, 24 Drawing Sheets

UNIFIED SUBDIVISION SCHEME FOR POLYGONAL MODELING

CROSS-REFERENCE TO RELATED APPLICATION(S)

This Application incorporates by reference U.S. Pat. No. 6,587,105, entitled: "Method and Computer Program Product for Subdivision Generalizing Uniform B-spline Surfaces of Arbitrary Degree."

BACKGROUND OF THE INVENTION

1. Field of the Invention

The present invention is directed to providing a general set of subdivision rules, which provides more control over the subdivision process. More particularly, the present invention provides a set of subdivision rules which blend approximating spline based schemes with interpolatory schemes, and allows any number of refinements to be performed in a single operation. The present invention also works for both triangles and quadrilaterals in the same mesh. The result is a subdivision scheme, which provides a more natural and desirable effect than existing rules.

2. Description of the Related Art

Subdivision surfaces are a popular modeling tool used in computer graphics. This is in part because these surfaces combine the benefits of both polygonal and NURBS (Non-Uniform Rational B-Spline) modeling. Subdivision surfaces, like NURBS, allow users to model smooth surfaces by manipulating a small set of control vertices. A subdivision scheme defines how a base mesh is iteratively divided until a "smooth" surface is produced.

Current subdivision rules, such as the Catmull-Clark algorithm, can result in a surface that is smaller than the base mesh. For example, see FIG. 1, which illustrates a prior art method of subdividing a base mesh 100. The base mesh 100 is divided into a first subdivided surface 102, the first subdivided surface 102 is further divided into a second subdivided surface 104. The second subdivided surface 104 can be continuously divided, resulting in an approximation of a limit curve 106. Note how the limit curve 106 is smaller than the original base mesh 100. This "distortion" is a result of the subdivision and smoothing schemes used, and may not be what the user intended. Further, current subdivision schemes and smoothing schemes may produce unwanted effects.

Another limitation of the prior art is that a base shape, for example a square, can only be subdivided into a number of smaller pieces that is a power of 4. For example, a square can be subdivided into a 2×2 grid of 4 pieces, a 4×4 grid of 16 pieces, etc. However, the prior art subdivision schemes do not allow for a square to be subdivided into an arbitrary number of pieces, for example a 5×5 grid of 25 pieces.

The prior art also does not allow to mix triangles and quadrilaterals in the same base mesh. For example, the Catmull-Clark method works only with quadrilaterals, the Butterfly method only with triangles. What was generally done was to perform a first ad hoc subdivision step to transform general objects into triangles or quads only. The problem with this is that the resulting shape is then generally not very pleasing.

Therefore, what is needed, is a more flexible approach of creating improved subdivision surfaces.

SUMMARY OF THE INVENTION

It is an aspect of the present invention to provide an improved set subdivision rules, which provide users with more control over the subdivision process.

It is another aspect of the present invention to allow a mesh to be subdivided into an arbitrary number of faces.

It is a further aspect of the present invention to allow a mesh to contain both quadrilaterals and triangles before subdividing.

It is still a further aspect of the present invention to provide a subdivision scheme which blends both interpolation and approximation schemes.

It is yet another aspect of the present invention to provide a subdivision scheme which allows a user to set certain corrections which result in a more desirable effect.

The above aspects can be attained by a system that performs a method including: (a) determining displacements between subdivided points of a base mesh and corresponding smoothed points of a smoothed subdivided surface based on the base mesh; and (b) moving the smoothed points by an interpolated displacement based on distances between smoothed points and their corresponding subdivided points.

These together with other aspects and advantages which will be subsequently apparent, reside in the details of construction and operation as more fully hereinafter described and claimed, reference being had to the accompanying drawings forming a part hereof, wherein like numerals refer to like parts throughout.

Figure 20A:
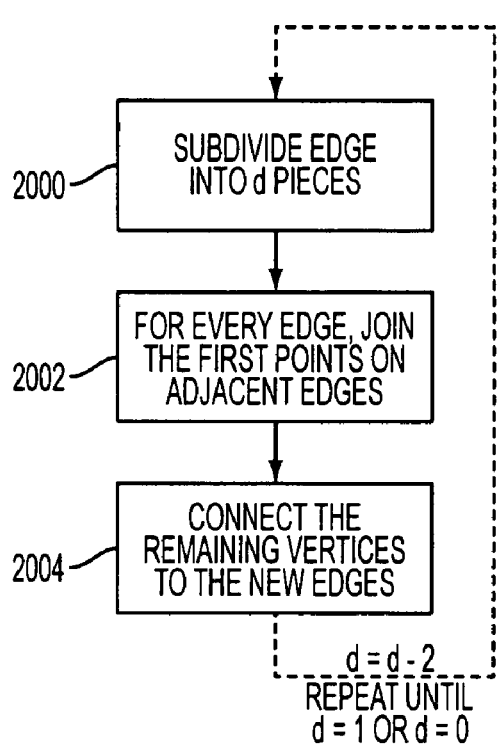

vector, according to an embodiment of the present invention;

FIG. 20A illustrates the subdividing process of an n-sided polygon.

Figure 20B:
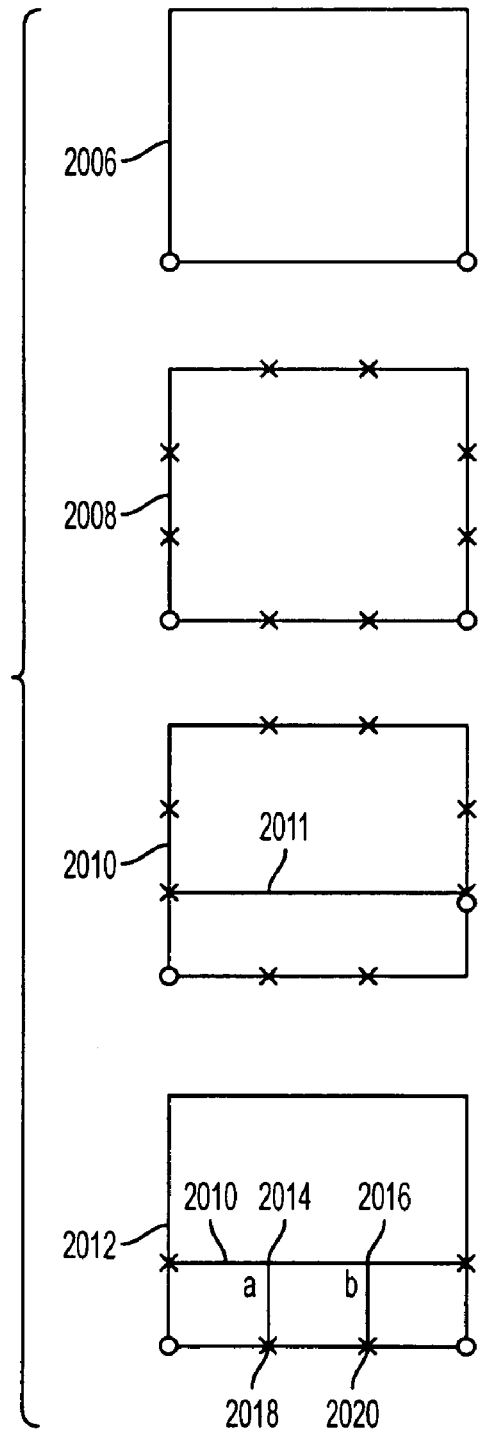
Figure 21A:
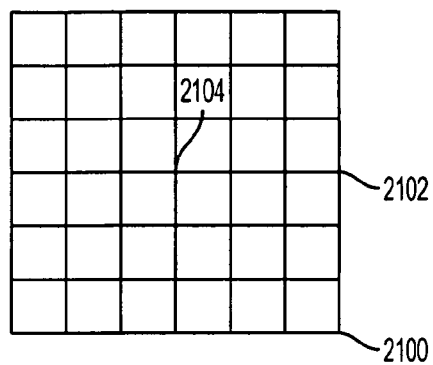
Figure 21B:
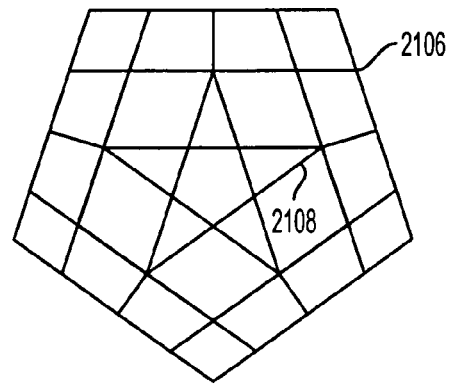
Figure 21C:
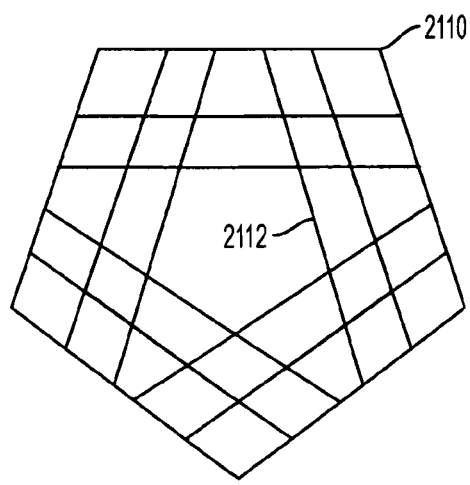
Figure 21D:
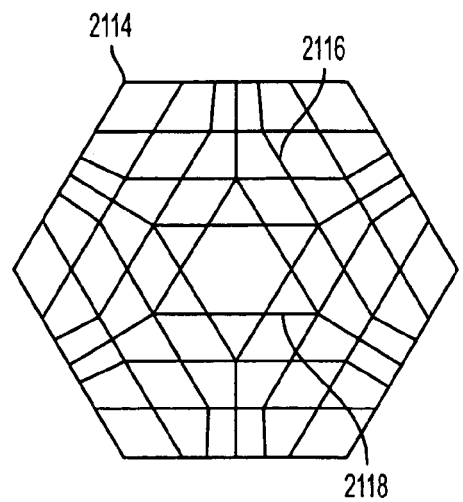
Figure 22A:
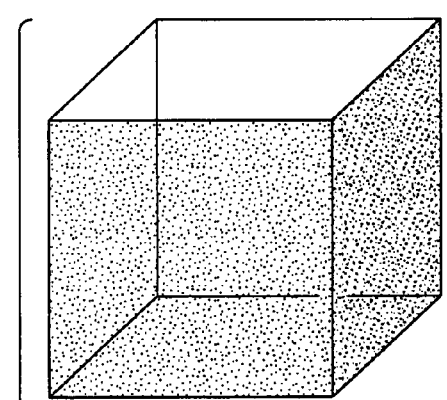
Figure 22A:
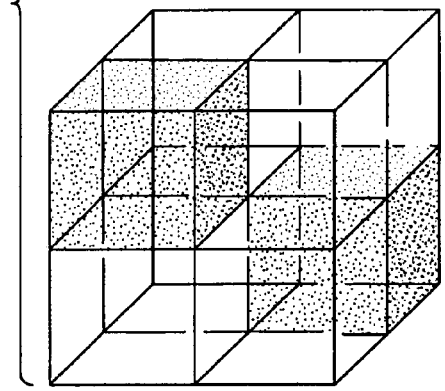
Figure 22B:
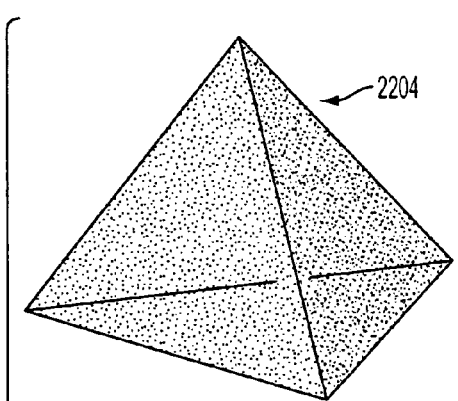
Figure 22B:
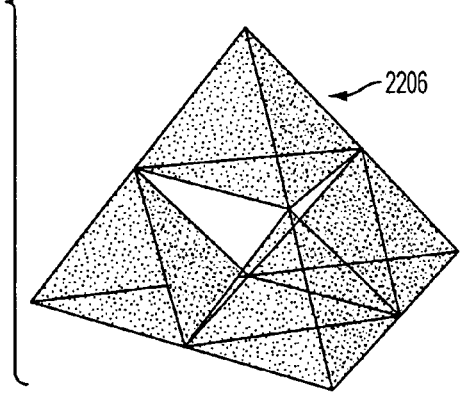
Figure 23A:
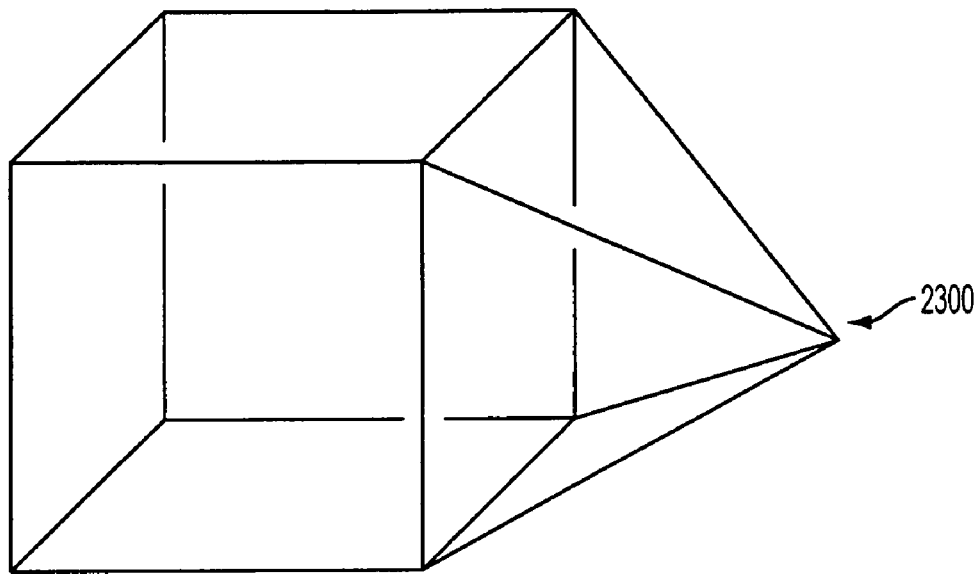
Figure 23B:
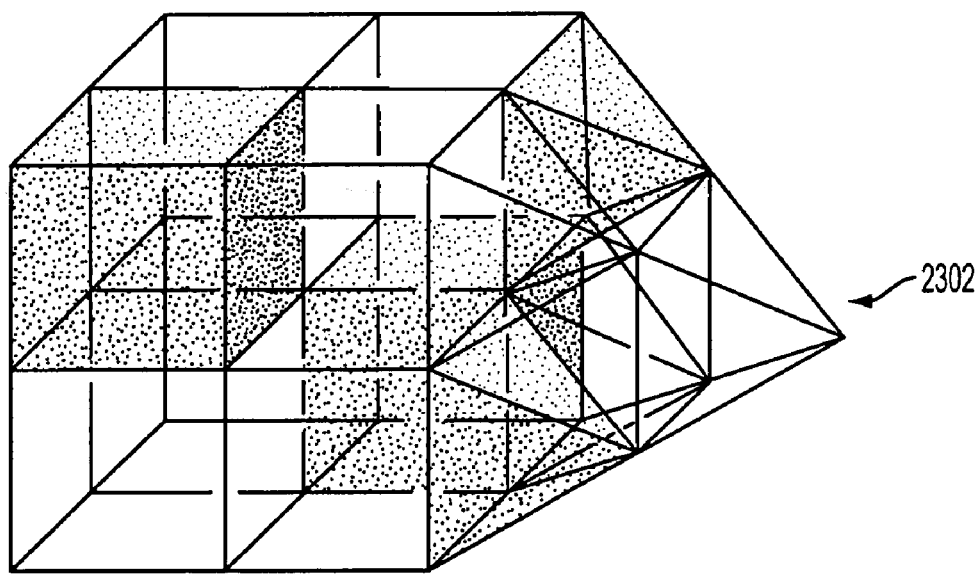

FIG. 20B illustrates an example of the subdividing process of an n-sided polygon using the process illustrated in FIG. 20A;

FIG. 21A illustrates the subdividing process of an n-sided polygon as applied to a square, with d=6. The three different colored shadings represent each different iteration of the process being applied;

FIG. 21B illustrates the subdividing process of an n-sides polygon as applied to a pentagon, with d=4. The two different colored shadings represent each different iteration of the process being applied;

FIG. 21C illustrates the subdividing process of an n-sides polygon as applied to a pentagon, with d=5. The two different colored shadings represent each different iteration of the process being applied;

FIG. 21D illustrates the subdividing process of an n-sides polygon as applied to a hexagon, with d=6. The three different colored shadings represent each different iteration of the process being applied;

FIG. 22A Illustrates a standard linear subdivision operation for cubes;

FIG. 22B illustrates a standard linear subdivision operation for tetrahedra;

FIG. 23 illustrates an example of linear subdivision of a 3D polytope; and

Figure 24:
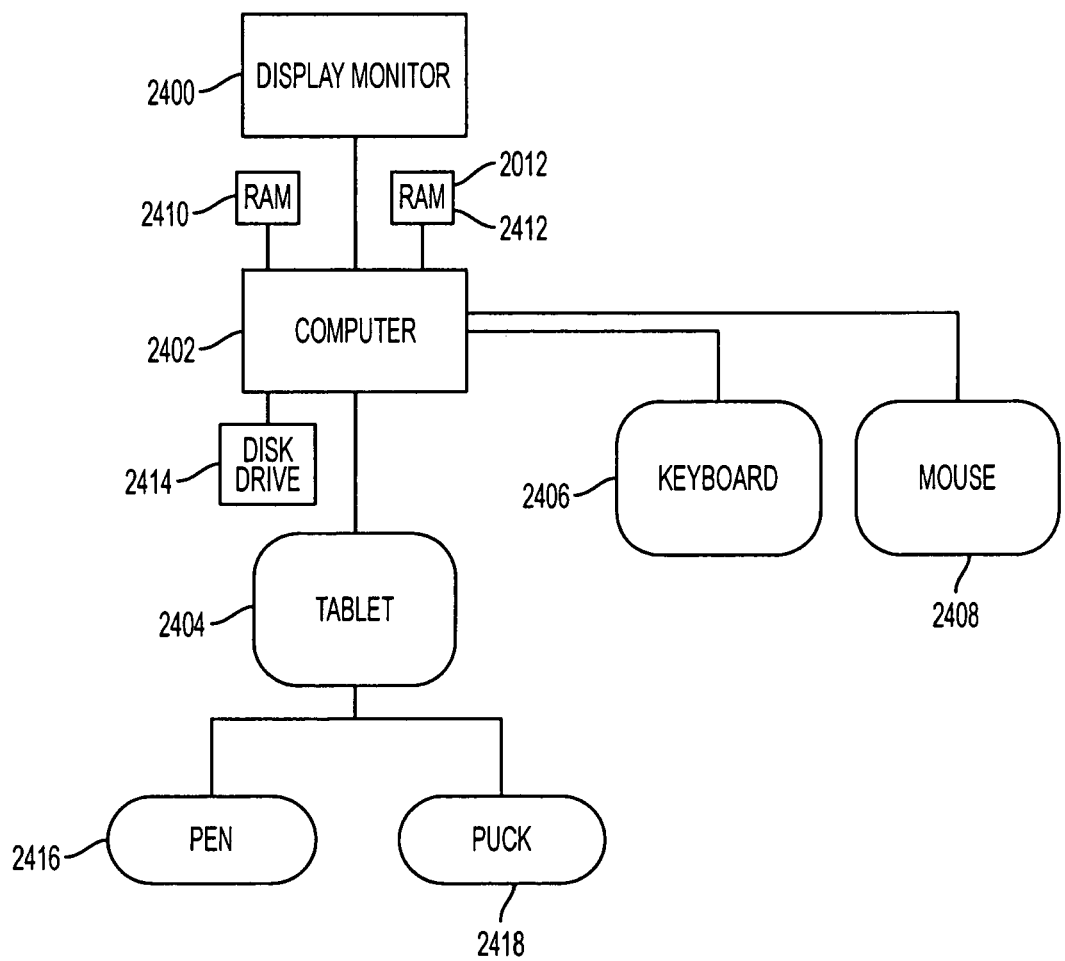

FIG. 24 is a block diagram illustrating one example of a configuration of hardware used to implement the present invention.

DETAILED DESCRIPTION OF THE PREFERRED EMBODIMENTS

The present invention can be described as a single parameterized scheme, which is a blend of an approximating and an interpolating scheme. This blend does a better job at preserving a silhouette and a volume of the meshes. When a surface is conventionally subdivided, the subdivided surface is then typically smoothed to maintain the shape of the base mesh. This smoothing nevertheless typically results in a distortion of the original shape. The present invention performs a push back of displaced vertices in order to compensate for this distortion.

The present invention performs the scheme in two operations: a linear subdivision, which increase the number of faces, vertices, edges; and then a smoothing operation, where the vertex positions are modified, regardless on how vertices were created. The prior art typically did everything in one operation.

Figure 2:
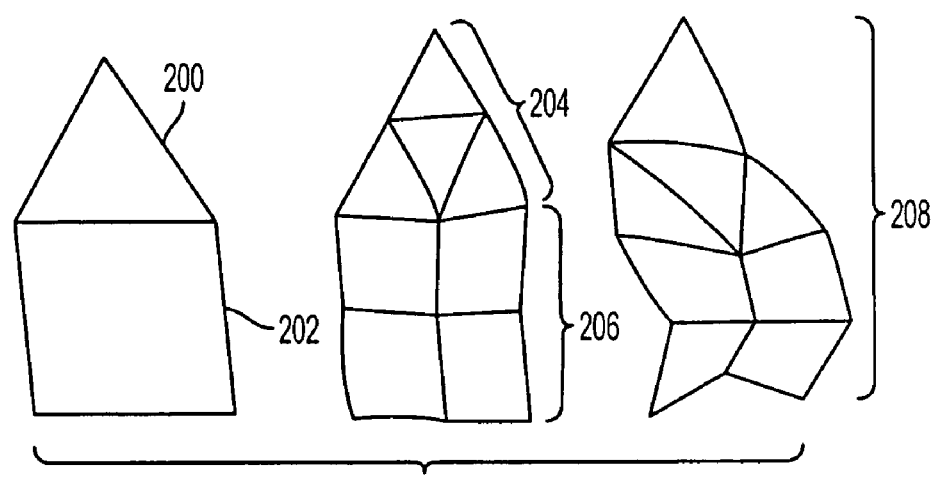
FIG. 2 illustrates the subdividing process, according to an embodiment of the present invention.

FIG. 2 illustrates the subdividing process. A base mesh is comprised of a triangle 200 and a square 202. The triangle 200 is divided into a subdivided triangle 204 with four pieces. The square 202 is divided into a subdivided square 206 with four pieces. A smoothing algorithm is then applied to the subdivided triangle 204 and the subdivided square 206 to produce a subdivided smooth surface 208. This process can be repeated a preset number of times until the desired effect is achieved. Note that the present invention allows for both triangles and squares to be subdivided in the same surface. This can be accomplished using methods described later on.

Figure 1:
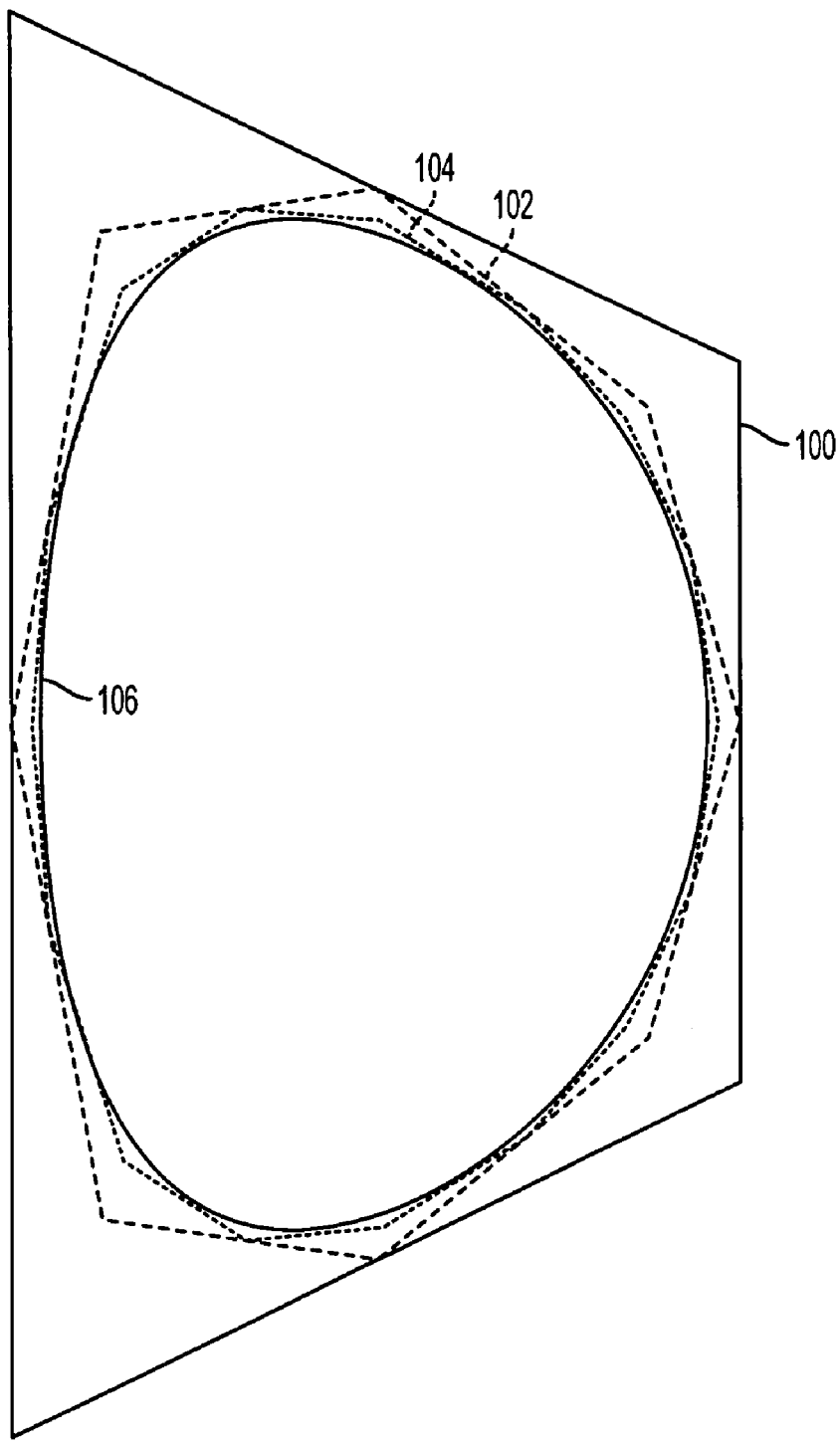
FIG. 1 illustrates a prior art method of how a base mesh is subdivided into a smooth surface.

Note that the iterative process described above may result in a surface smaller than the original mesh, as illustrated in FIG. 1. To compensate for this effect, a "push back" operation can be implemented which moves each original vertex back towards the vertex's original position (before smoothing) by an amount controlled by the user. The push back operation will now be described.

Figure 3:
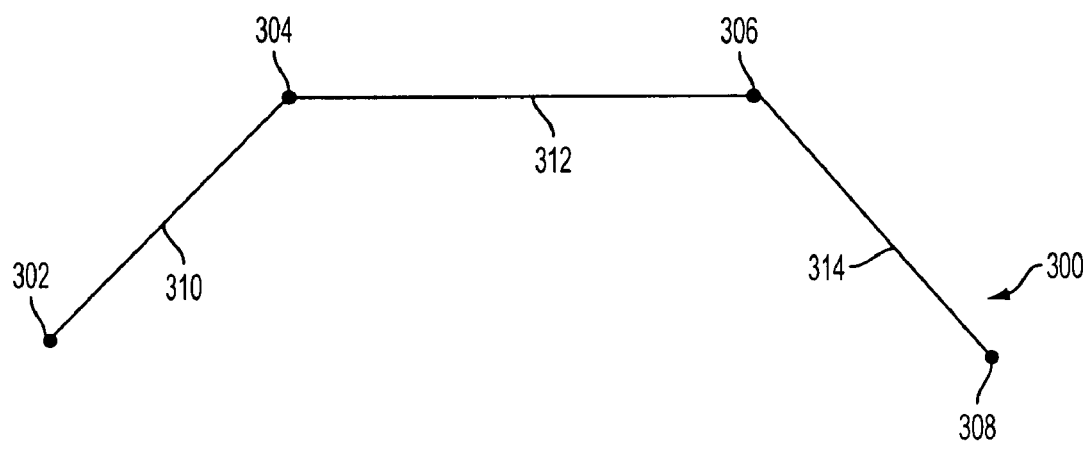
FIG. 3 illustrates three segments comprising a polyline made of a B-spline curve, according to an embodiment of the present invention.
Figure 4:
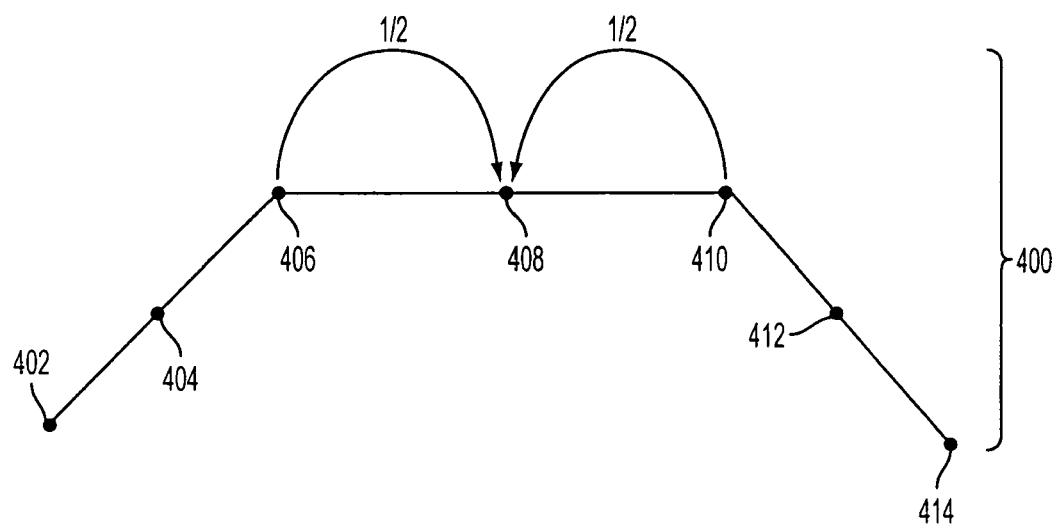
FIG. 4 illustrates the segments in FIG. 3 linearly divided into a 6 segment polyline, according to an embodiment of the present invention.

FIG. 3 illustrates three segments comprising a polyline made of a B-spline curve. Polyline 300 comprises vertices 302, 304, 306, and 308, which define segments 310, 312, and 314, respectively, FIG. 4 illustrates the segments in FIG. 3 linearly divided into a 6-segment polyline. This division is typically performed in a subdivision surface in order to increase the number of pieces of a segment (or surface) in order to produce smoother results. The polyline 400 comprises vertex 402 (corresponding to vertex 302), new vertex 404, vertex 406 (corresponds to vertex 304), new vertex 408, vertex 410 (corresponds to vertex 306), new vertex 412, and vertex 414 (corresponds to vertex 308). The division can be performed in any conventional manner.

Figure 5:
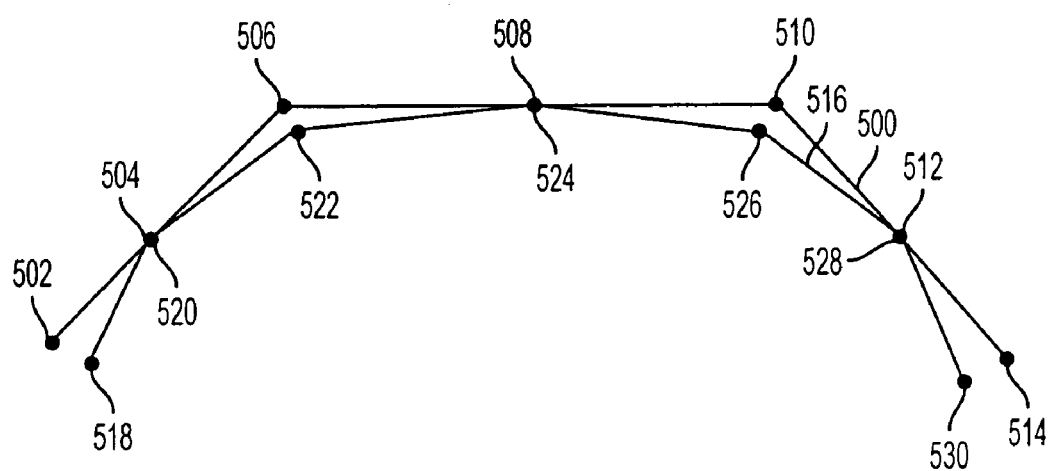
FIG. 5 illustrates smoothing of the polyline, according to an embodiment of the present invention.

FIG. 5 illustrates smoothing of the polyline. The smoothing is typically performed so that the subdivided polyline is smoother and rounder. The original polyline 500 comprises points 502, 504, 506, 508, 510, 512 and 514. The original polyline 514 can be smoothed into a smoothed polyline 516, comprising points 518, 520, 522, 524, 526, 528, and 530. The smoothing can be performed using any conventional technique, such as smoothing with a [1 2 1] mask as illustrated.

Figure 6:
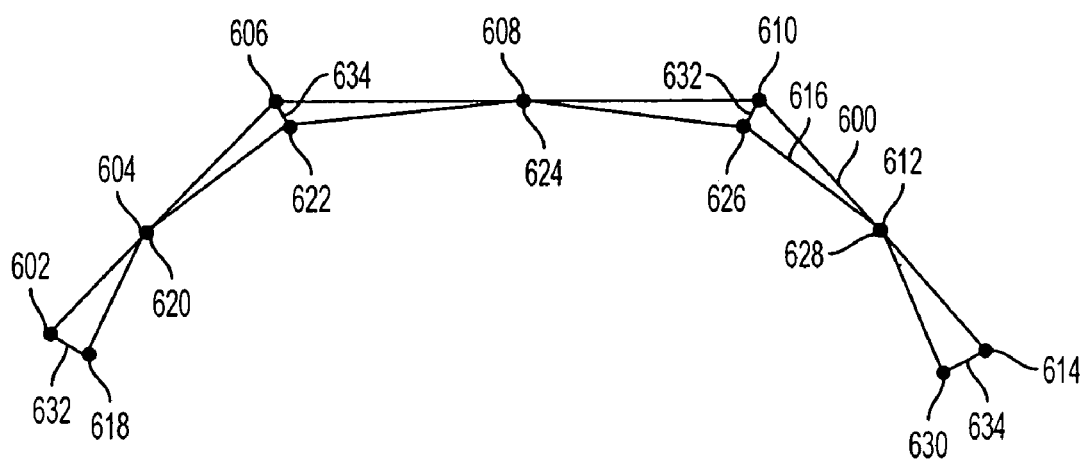
FIG. 6 illustrates a determination of displacement from the original points, according to an embodiment of the present invention.

FIG. 6 illustrates a determination of displacement from the original points. The displacement is determined so that it can be used to subsequently calculate an interpolated displacement, which is ultimately used to compensate for any distortion resulting from the smoothing. Subdivided original polyline 600 (before smoothing) comprises points 602, 604, 606, 608, 610, 612, and 614. The smoothed polyline 616 comprises points 618, 620, 622, 624, 626, 628, and 630. Displacement 632 is determined which is the distance between subdivided point 602 and its corresponding smoothed point 618. Displacement 634 is determined which is the distance between subdivided point 606 and its corresponding smoothed point 622. Displacement 632 is determined which is the distance between subdivided point 610 and its corresponding smoothed point 626. Displacement 634 is determined which is the distance between subdivided point 614 and its corresponding smoothed point 630. Displacements are only computed between original points (302, 304, 306, 308) and the corresponding ones in the subdivided and smoothed surface. The other displacements are not meaningful. Missing displacement vectors are interpolated as described in the paragraph below.

Figure 7:
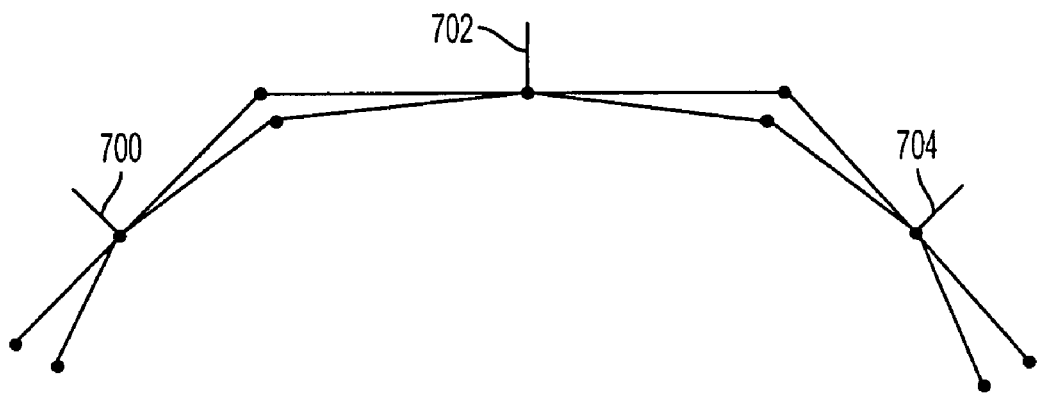
FIG. 7 illustrates linear interpolation of the displacement, according to an embodiment of the present invention.

FIG. 7 illustrates linear interpolation of the displacement. The linear interpolation of the displacement is calculated so it can be subsequently used to compensate for any distortion resulting from the smoothing. Interpolated displacement vectors 700, 702, and 704 are computed based on the displacements illustrated in FIG. 6. The interpolation can be performed by any conventional method, typically a linear method.

Figure 8:
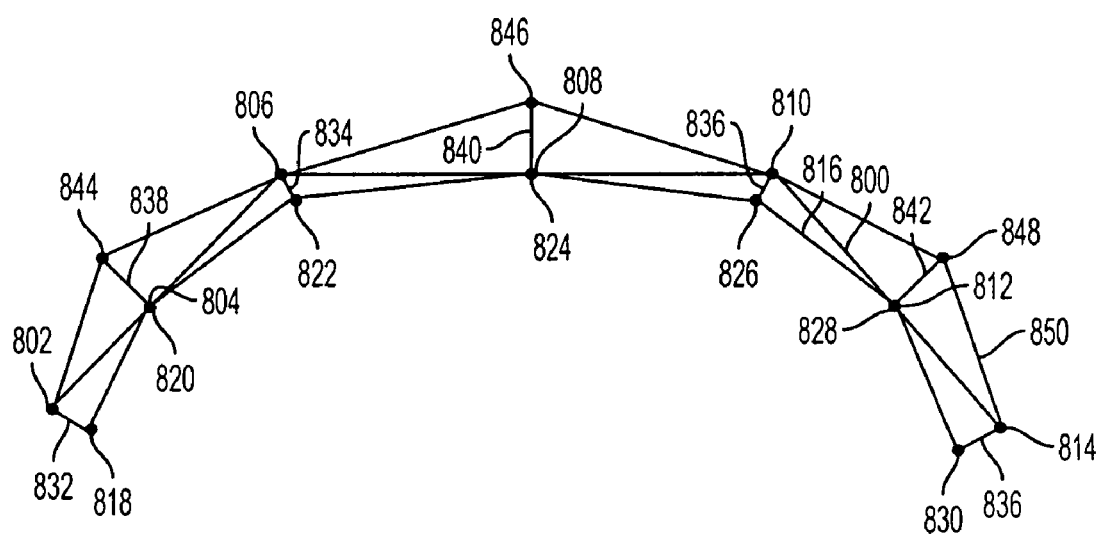
FIG. 8 illustrates moving points (or "push back") to compensate for distortion during the smoothing.

FIG. 8 illustrates moving points (or "push back") to compensate for distortion during the smoothing. Subdivided polyline 800 comprises points 802, 804, 806, 808, 810, 812, and 814. The smoothed polyline 816 comprises points 818, 820, 822, 824, 826, 828, and 830. Displacements 832, 834, 836, and 838 are determined based on distances between points on the original polyline and their corresponding smoothed subdivided points. Interpolated displacement vectors 838, 840, and 842 are interpolated displacements based on the determined displacements. Points 844, 846, and 848 correspond to points 804, 808, and 812 after being moved by the corresponding interpolated displacement vector (838, 840, 842). Thus, the corrected polyline 850 after the push back operation comprises the points 802, 844, 806, 846, 810, 848, and 814.

Figure 9:
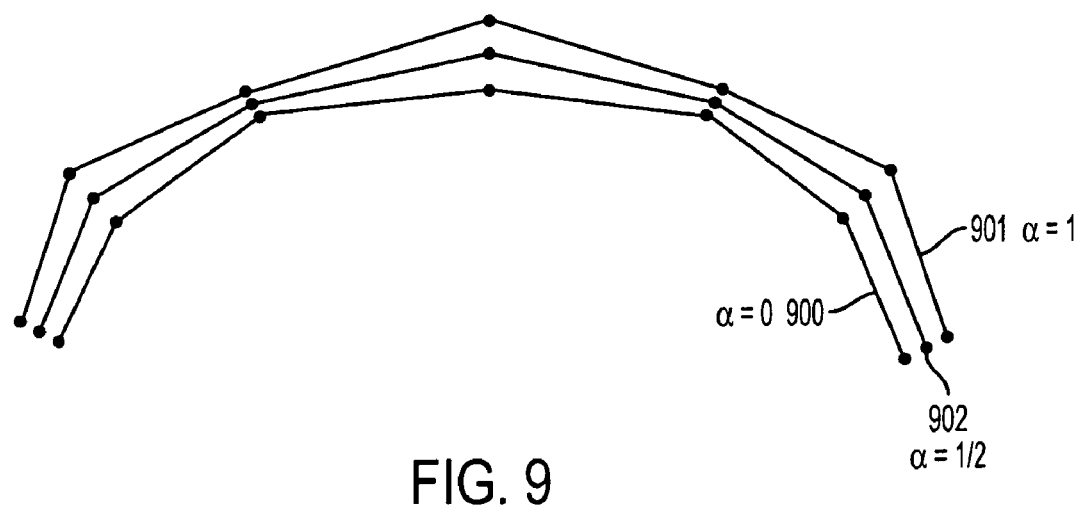
FIG. 9 illustrates how the push back effect can be weighted by a volume parameter, according to an embodiment of the present invention.

FIG. 9 illustrates how the push back effect can be weighted by a volume parameter, herein defined as $\alpha$. The volume parameter allows a user to specify how much "push-back effect" is desired. Generally, the greater the value used for $\alpha$, the larger the volume of the resulting polyline. Polyline 900 (corresponding to polyline 816 from FIG. 8) illustrates the case where $\alpha=0$. In this case, no interpolation is reflected, as this is a pure approximation scheme. Polyline 902 (corresponding to polyline 850 from FIG. 8) illustrates the case where $\alpha=1$, whereas this is a pure interpolation scheme (in which the original vertices do not move). Polyline 904 illustrates the case where $\alpha=\frac{1}{2}$, which comprises a "blended" interpolation and approximation scheme. Generally speaking, setting $\alpha=\frac{1}{2}$ typically produces the best effects, although of course the user will want to adjust this parameter to suit his preferences.

Figures 10A, 10B, 10C:
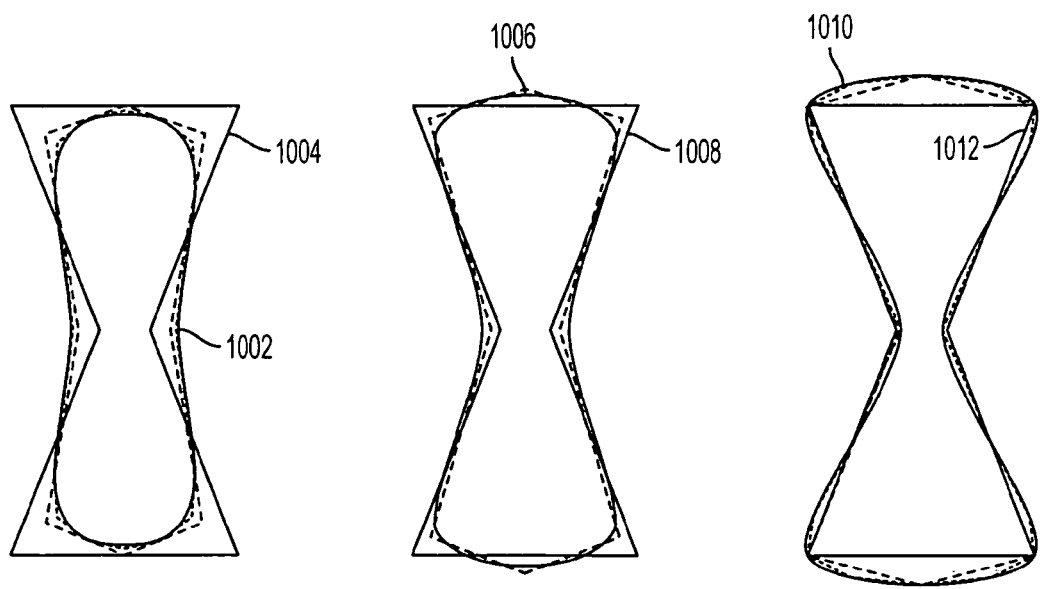
FIGS. 10A, 10B, and 10C illustrate the effects of changing a, according to an embodiment of the present invention.

FIGS. 10A, 10B, and 10C illustrate the effects of changing $\alpha$. FIGS. 10A, 10B, and 10C illustrate refinement operations 1, 2 and the limit curve, using degree three interpolation and a division value d-2. In FIG. 10A, $\alpha=0$. Note how the limit curve 1002 is smaller than the base mesh 1004. In FIG. 10B, $\alpha=\frac{1}{2}$. Note how the limit curve 1006 more closely follows the base mesh 1008. In FIG. 10C, $\alpha=1$. Note how the limit curve 1010 has a larger volume than the base mesh 1010. Note that the present invention is equally beneficial for three-dimensional (or higher) surfaces as well.

Figure 11:
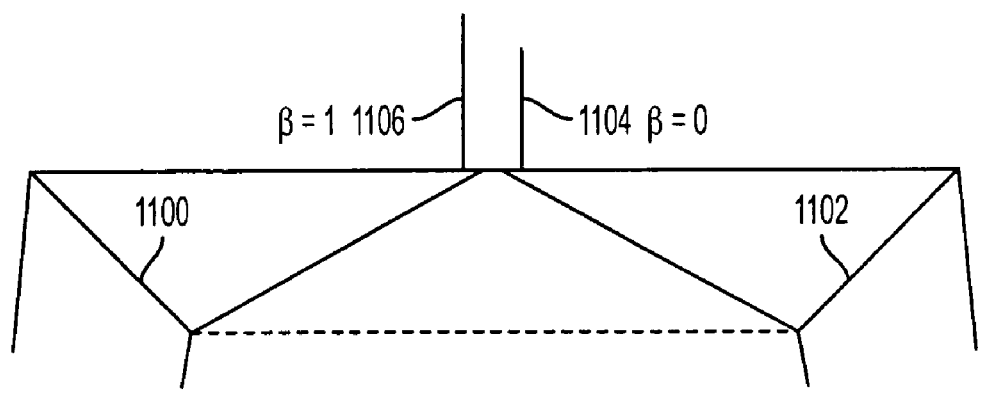
FIG. 11 illustrates how the push back effect can also be weighted by a rounding parameter, according to an embodiment of the present invention.

FIG. 11 illustrates how the push back effect can also be weighted by a rounding parameter, herein defined as $\beta$. $\beta$ is a parameter used to bulge flat areas around segment centers. Note that displacements 1100 and 1102 have a sharp angle between them, and an interpolated vector between them may not produce ideal results. An interpolated vector between two vectors with a very sharp angle between them may approach zero. Because of this, areas toward the ends of spherical surfaces may look "boxy" (see FIG. 17A for an example). Thus we introduce a rounding parameter $\beta$ which weights (normalizes) the interpolation results when around segment centers. 1104 illustrates the interpolation result when $\beta=0$, while 1106 illustrates the interpolation result when $\beta=1$. More on the rounding parameter will be described below.

Figure 12:
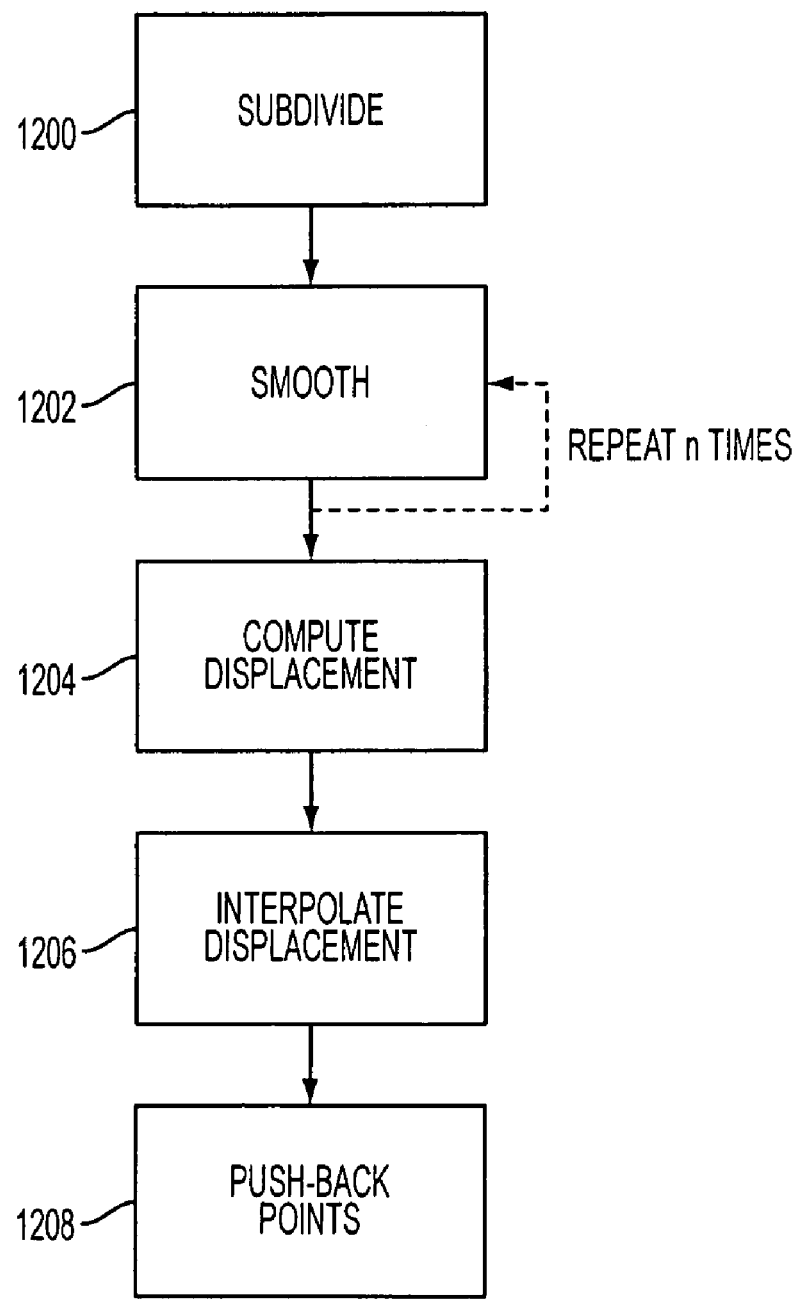
FIG. 12 illustrates a flowchart of one possible implementation of the methods of the present invention, according to an embodiment of the present invention.

FIG. 12 illustrates a flowchart of one possible implementation of the methods of the present invention, according to an embodiment of the present invention. A computer implementing the method first subdivides 1200. After subdividing, the computer smoothes 1202 the subdivided surface. The smoothing operation can be repeated n times, as set by the user. After the smoothing is performed, the computer computes 1204 displacement of the subdivided points and the smoothed points. The computer then interpolates 1206 the displacement between the original subdivided points and the smoothed points. The computer then pushes back 1208 points based on the interpolated displacement. Repeating N times can include either 1202 only as shown or all 1202–1208 operations. In the later case, the push back will be smoother, as it's done as many small adjustments, as opposed to one big adjustment at the end. This is generally preferable. Repeating only 1202 will be slightly faster to compute, but the surface typically will have a slightly lower quality.

Optionally, the user can set a push back weight (or volume parameter). The user can also optionally set a rounding (or bulging parameter).

The prior art limits a number of faces into which a surface can be subdivided. For example, the prior art allows a square to be divided into a grid of (n×n). Thus, a square can be divided into 2×2=4 faces, 4×4=16 faces, etc. The Prior art always subdivided a face into 4 pieces, whether for triangle or quadrilateral schemes. The present invention allows dividing into p×p pieces at each step, thus giving a total of $(p \times p)^m$. Continuous subdividing into faces of a power of 4 results in a growth which some users may consider too high.

In another embodiment of the present invention, a line (or surface) can be subdivided into an arbitrary number of pieces (or faces). A surface can be subdivided into an arbitrary number of pieces not limited to a power of four like the prior art.

Figure 13:
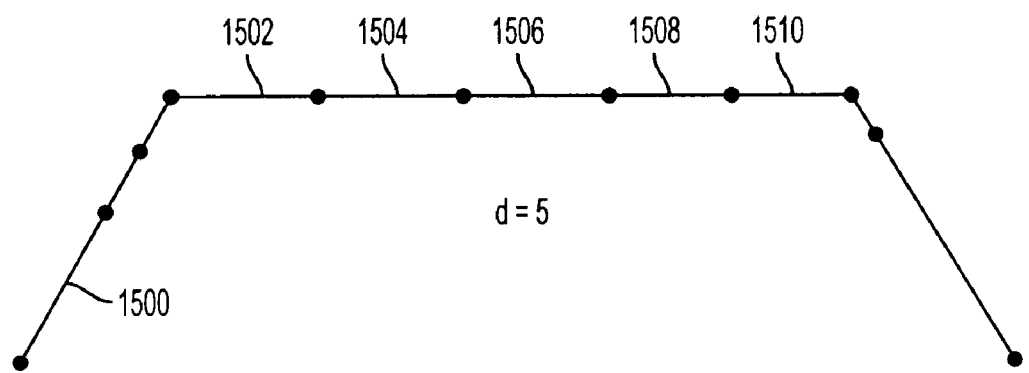
FIG. 13 illustrates linearly subdividing an original polyline by an odd number, particularly into d=5 pieces.

FIG. 13 illustrates linearly subdividing an original polyline by an odd number, particularly into d=5 pieces. The top segment of polyline 1500 is divided into pieces 1502, 1504, 1506, 1508, and 1510. The center segment is needed for the subdivision operation. The smoothing needs the first neighbors too.

Figure 14:
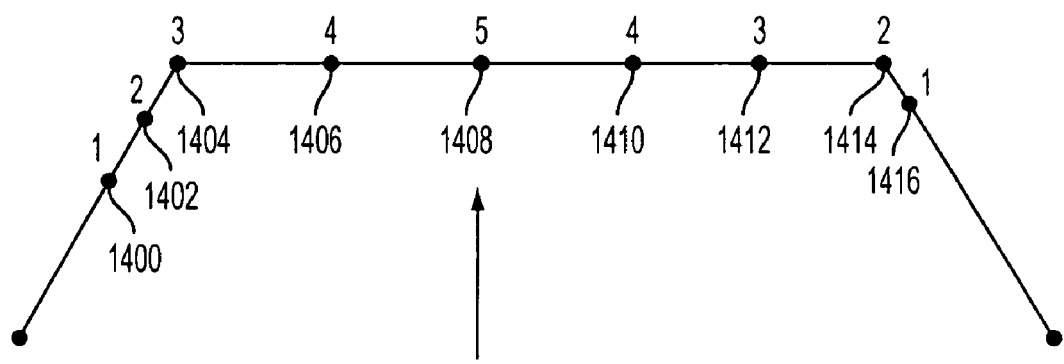
FIG. 14 illustrates using a smoothing mask on the subdivided pieces in the odd number subdivisions.

FIG. 14 illustrates using a smoothing mask on the subdivided pieces in the odd number subdivisions. A [1 2 . . . d . . . 2 1] smoothing mask is applied. Points along the polyline are numbered 1-1400, 2-1402, 3-1404, 4-1406, 5-1408, 4-1410, 3-1412, 2-1414, 1-1416. The mask requires the position of some of the vertices from the next segments. There are more, but only the ones overlapping with the mask are drawn.

Figure 15:
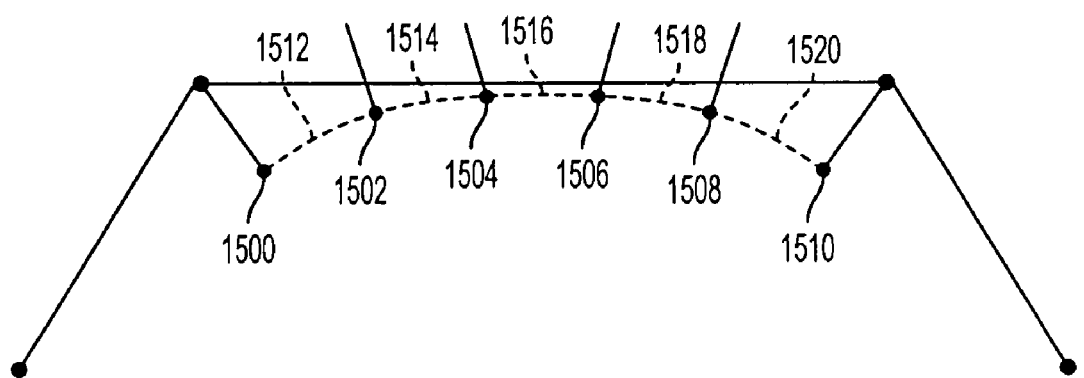
FIG. 15 illustrates linear interpolation of push back vectors for the odd number subdivisions.

FIG. 15 illustrates linear interpolation of push back vectors for the odd number subdivisions. The linear interpolation can be performed by any conventional method as described herein or elsewhere. Points 1500, 1502, 1504, 1506, 1508, and 1510 are the smoothed points corresponding to points 1404, 1406, 1408, 1410, 1412, and 1414. Thus, we have now subdivided the original polyline into 5 pieces (1512, 1514, 1516, 1518, 1520). The prior art only divided in 2, and explicitly defined the resulting position.

We will now elaborate on the above methods and describe their implementation in more detail.

One type of smoothing method is described in the Article titled "On Subdivision Schemes Generalizing Uniform B-Spline Surfaces of Arbitrary Degree," by Jos Stam. B-splines of odd degree p can be subdivided by first linearly subdividing the control mesh and then performing $$m = \frac{p-1}{2}$$

smoothing operations. Each operation involves averaging a vertex with its immediate neighbors using the $$\left[\frac{1}{4} \frac{1}{2} \frac{1}{4}\right]$$

weights. The binomial coefficients are easily computed using Pascal's triangle:

$$\frac{1}{1} \times \quad 1\ 1$$

$$\frac{1}{2} \times \quad 1\ 2\ 1$$

$$\frac{1}{4} \times \quad 1\ 3\ 3\ 1$$

$$\frac{1}{8} \times \quad 1\ 4\ 6\ 4\ 1$$

For example, from the last line we obtain the subdivision masks for B-spline curves of degree three. Every old vertex is updated using the $$\left[\frac{1}{8} \frac{6}{8} \frac{1}{8}\right]$$

weights, while the new vertices are inserted between the old vertices using the $$\left[\frac{4}{8} \frac{4}{8}\right]$$

masks. The crucial observation is that these two masks are obtained by simply applying the $$\left[\frac{1}{4} \frac{1}{2} \frac{1}{4}\right]$$

mask to the second row, which corresponds to the subdivision rules of linear subdivision. In fact, this construction is easily generalized to any number of subdivisions d. In this case we generalize the Pascal triangle to take the advantage of the d elements in the row directly above it:

| 1 | 1 | 1 |
|---|---|---|
| 1 1 | 1 1 1 | 1 . . . 1 |
| 1 2 1 | 1 2 3 2 1 | 1 2 . . . d . . . 2 1 |

This allows us to compute the corresponding masks for these subdivision schemes. First, linearly subdivide each segment into d pieces, then smooth each vertex using the mask $$\frac{1}{d^2}[1, 2, \ldots, d, \ldots, 2, 1].$$

In the limit this process generates B-spline curves of degree 2m+1 if the smoothing is applied m times. Note that any conventional smoothing method can be used to present invention We add the push back operation that updates the position of the vertices after smoothing, order to limit the amount of the shrinking characteristic of approximating subdivision schemes. Each original vertex is moved back towards its original position by an amount controlled by the user. Newly introduced vertices are also adjusted by linear interpolation of the adjusted original vertices. We denote by $P_j$ the new vertices obtained by subdividing the original vertices $$P_j^1.$$

Throughout the following description, ":=" denotes assignment, while "=" denotes a true equality of two quantities. In these notations, the first operation is (note that d=number of pieces, and k is a temporary variable representing a distance from the closest original vertex on the left.

See Appendix, Equation 1

See Appendix, Equation 2

This operation is followed by a smoothing operation that modifies the vertices $P_j$:

See Appendix, Equation 3

Finally, the smoothing operation is followed by a push-back of these new vertices:

See Appendix, Equation 4

See Appendix, Equation 5

See Appendix, Equation 6

Evaluations are done in parallel in a conventional "Jacobi manner" to avoid any side effects. In practice this requires the use of an intermediate array to store the vertices' positions. The volume parameter a controls the transition from approximation to interpolation. When α=0 there is no push-back operation and the subdivision scheme produces uniform B-splines in the limit. On the other hand, when α=1 the scheme described herein is interpolatory. FIG. 4 shows the influence of the parameter a on the subdivided control vertices after several refinements.

When the degree p is greater than three, the smoothing and push-back operations are repeated $$\frac{p-1}{2}$$

times. In particular, when p=3 and d=2, one smoothing and one push-back operation is performed. In this case we can explicitly write down the subdivision matrix applied to five consecutive control vertices:

See Appendix, Equation 7

In particular, when α=1, the $P_{2i}$ are moved back exactly to their original position $P_i$, and we obtain the well known four point interpolation scheme, with $$\begin{bmatrix} \frac{-1}{16} & \frac{9}{16} & \frac{9}{16} & \frac{-1}{16} \end{bmatrix}$$

weights[4].

The surface case is similar to the curve one: we perform one bilinear subdivision operation followed by a smoothing operation.

We first define rules for binary subdivision schemes when d=2. We introduce the following notations. The number of elements in a set A is denoted by A#. The vertices of the mesh before a subdivision operation are denoted by $v_1^i$. During a subdivision operation these vertices are transformed into new vertices $V_i$. At the same time new vertices $E_i$ are introduced by splitting each edge, and new vertices $F_i$ are introduced for each face as in FIG. 5. Let P be a vertex of the mesh, then E(P) is the set containing all the vertices sharing an edge with P. The set C(P) contains the "corner vertices:" the vertices sharing a face with P not in E(P).

Figure 16A:
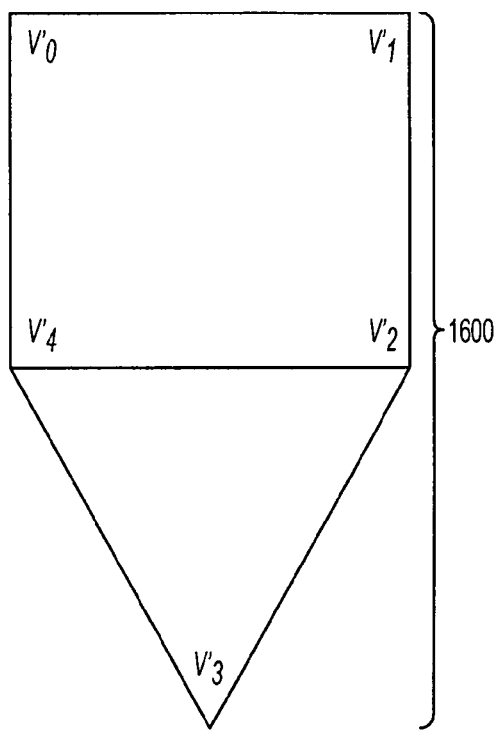
FIGS. 16A and 16B illustrate subdivisions of quadrilaterals and triangles, according to an embodiment of the present invention.
Figure 16B:
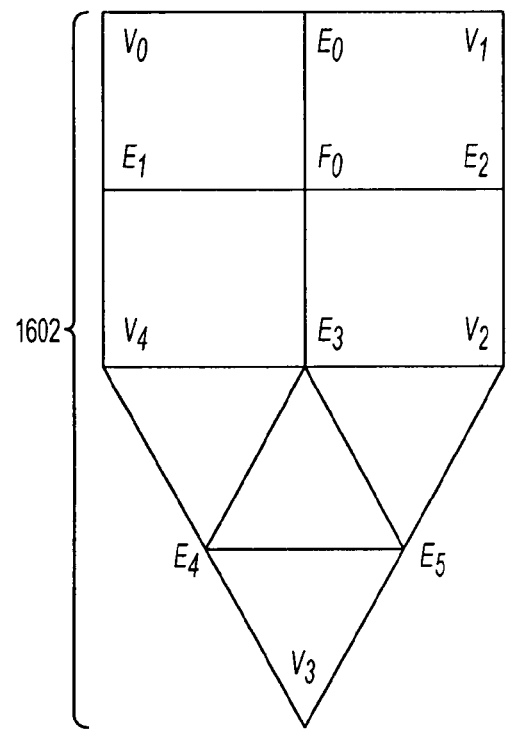

FIGS. 16A and 16B illustrate subdivisions of quadrilaterals and triangles. FIG. 16A illustrates an initial mesh 1600. FIG. 16B illustrates a subdivided mesh 1602, that is the mesh of FIG. 16A after one subdivision. Each subdivision produces V, E, and F vertex types. Faces with 5 and more vertices use the quadrilateral subdivision rule. To illustrate the above definitions refer to FIGS. 16A and 16B, wherein $E(V_2)=\{E_2,E_3,E_5\}$, and $C(E_3)=\{E_1,E_2\}$.

We will now focus entirely on quadrilateral schemes. However, triangular schemes can be treated in a similar way, with the exception that there are no face vertices $F_i$, and C(V) is always empty. The subdivision operation should distinguish between these two types of faces.

The Stam article previously mentioned provides different smoothing rules of the vertices that result in uniform B-spline surfaces in the limit on the regular part of the mesh. The simplest smoothing algorithm which corresponds to "repeated averaging" replaces each vertex by a weighted average of its direct neighbors:

See Appendix, Equation 8
See Appendix, Equation 9

Catmull-Clark surfaces are obtained with a different choice for the weights:

See Appendix, Equation 10

We observe that Formulae 9 and 10 are identical when $N_i=4$. This comes as no surprise since both of these schemes produce uniform B-spline surfaces on regular meshes ($N_i=4$ everywhere). We further observe that, when $N_i \neq 4$, the Catmull-Clark rule can be obtained by following Formula 9 with an adjustment of all the extraordinary vertices:

See Appendix, Equation 11
See Appendix, Equation 12
See Appendix, Equation 13

The parameter γ allows us to interpolate between the two schemes. Not only does this adjustment unify these two schemes, but it also simplifies the implementation of the Catmull-Clark subdivision: a simple smoothing followed by a vertex update operation.

Following the curve case, the simplest push-back operation is to compute the differences $\Delta_i$ between $V_i^1$ and $V_i$, followed by a (bi-)linear interpolation of these differences for the new $E_i$ and $F_i$ vertices.

See Appendix, Equation 14
See Appendix, Equation 15
See Appendix, Equation 16
See Appendix, Equation 17

However, close to very sharp corners the scheme of the present invention tends to create flat areas around the face centers. The reason is that a bilinear interpolation of vectors of the same length with different angles produces smaller vectors at the center of the faces. This is a well known artifact of certain renderers, which do not renormalize vertex normals after interpolation, and consequently produce darker areas in the face centers.

We can fix this problem by introducing a renormalization operation for the interpolation of the Δ vectors. This is achieved by interpolating the length and direction of the Δ vectors separately. To smooth the transition between these new rules and the ones without the normalization, we introduce a rounding factor parameter β.

See Appendix, Equation 18
See Appendix, Equation 19
See Appendix, Equation 20
See Appendix, Equation 21

When β=0 there is no renormalization, while when β=1 the lengths of the Δ are exactly interpolated. In the case β≠0 these subdivision rules do not reproduce uniform B-splines on the regular part of the mesh in the limit. This doesn't matter since we do not use these rules to generate limit surfaces.

Figure 17A:
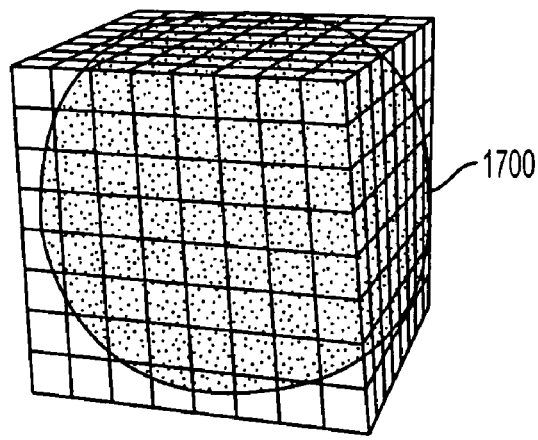
FIGS. 17A, 17B, and 17C illustrate how meshes are deformed when β is increased, according to an embodiment of the present invention.
Figure 17B:
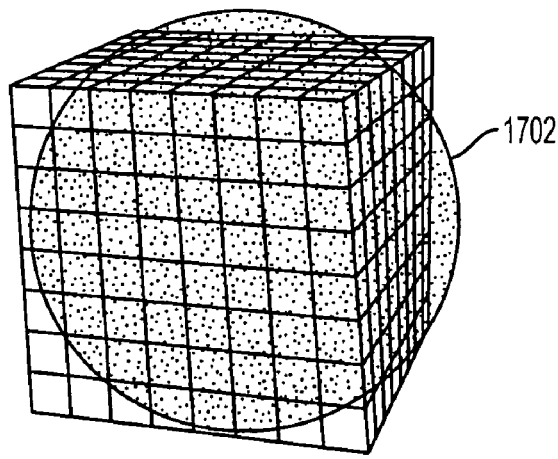
Figure 17C:
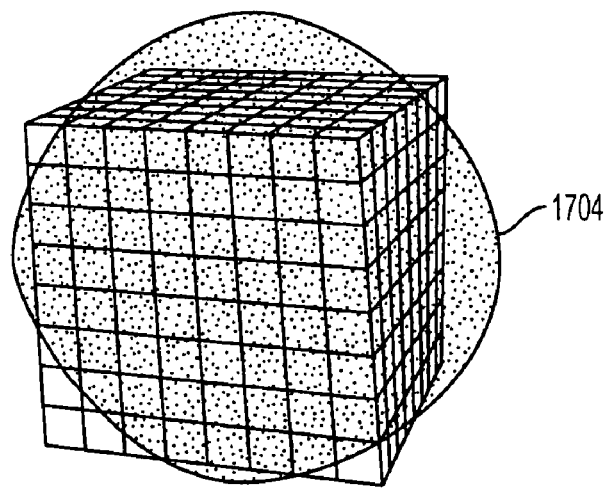

FIGS. 17A, 17B, and 17C illustrate how meshes are deformed when β is increased. FIG. 17A illustrates a case where β=0. Note how the sphere 1700 has a square-like shape. FIG. 17B illustrates a case where β=½. Note how the sphere 1702 has a rounder shape. FIG. 17C illustrates a case where β=1. Note how the shape of the sphere 1704 is affected. For a cube, $$\beta = \frac{1}{2}$$

produces the most "rounded" meshes. Note that in this example we have γ=0 (no Catmull-Clark) to emphasize the flattening problem.

The present invention allows for subdivision into an arbitrary number of pieces. For regular meshes the corresponding limited surfaces Σ(s,t) are equal to a tensor product of uniform B-spline curves. Therefore, the subdivision scheme for these surfaces is simply a linear subdivision operation followed by a smoothing operation with a mask equal to the tensor product of the mask $$\frac{1}{d^2}[1, 2, \ldots, d, \ldots, 2, 1]$$

derived in Section 3.1.1.

These rules can be naturally extended to extraordinary regions. Ordinary regions are made either of triangles only, where all vertices have 6 neighbors; or made of quadrilaterals only, where all vertices have exactly 4 neighbors. In practice, it turns out that it is easier to decompose the smoothing operation into two simple averaging operations. The averaging operation is different depending on whether d is odd or even. In the odd case we replace each vertex by a simple average of its k-ring neighborhood, where, where $$k = \frac{d-1}{2}.$$

When d is even, each averaging operation replaces each face with a vertex that is the average of the k-ring of vertices surrounding it, where $$k = \frac{d}{2}.$$

The new vertices after this operation form the dual of the initial mesh. In practice, however, the dual is never explicitly computed since the averaging operation is always performed twice (an even amount in general). After two dualizations the vertices are again "in place."

More formally, let $V_k(V_i)$ be the set of all vertices which can be reached from $V_i$ by traversing at most k faces and let $F_k(V_i)$ denote the corresponding set of the faces traversed.

Figure 18A:
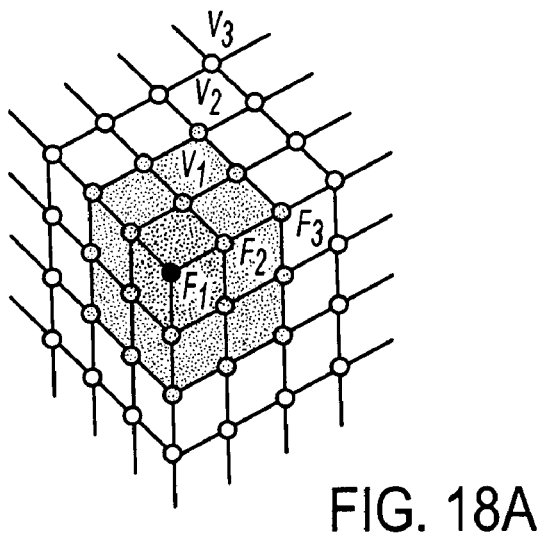
FIGS. 18A, 18B, and 18C illustrate examples of vertex (or face) neighborhoods, according to an embodiment of the present invention.
Figure 18B:
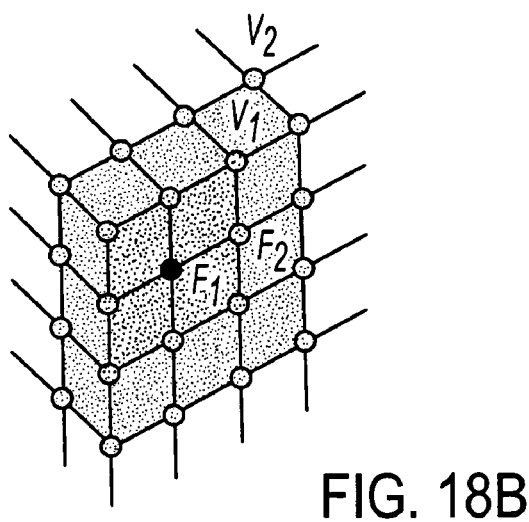
Figure 18C:
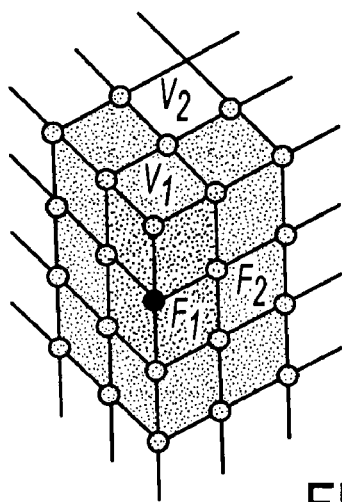

FIGS. 18A, 18B, and 18C illustrate examples of vertex (or face) neighborhoods. Vertex (or face) neighborhoods $V_k[F_k]$ are defined by adding one more ring to the previous set. For some examples. We also define a set of face neighborhoods by $V_k(F_i) = U_{V \in Fi} V_K(V)$.

Using these definitions we can explicitly state the smoothing operations. When d is odd, we apply the following rule p−1 times, where $$k = \frac{d-1}{2}:$$

See Appendix, Equation 22

When d is even the procedure typically only works for odd degrees p. We set the neighborhood to $$k = \frac{d}{2},$$

and we apply the rule (23)

$$\frac{p-1}{2}$$

times followed by (24):

See Appendix, Equation 23

See Appendix, Equation 24

In practice, we prefer odd degrees so that no constraint is necessary on the number of subdivisions d.

The Catmull-Clark correction operation defined by Formula 11 was introduced for the case d=2 and is typically applied to the extraordinary vertices of the mesh. For arbitrary divisions d we observe that this correction influences a small neighborhood around each extraordinary vertex.

Figure 19A:
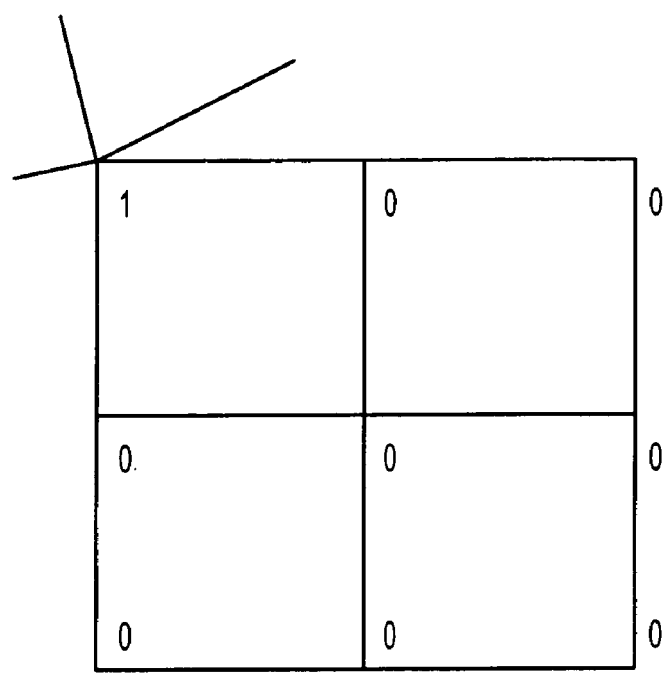
FIGS. 19A and 19B illustrate Catmull-Clark correction weights of the first two operations, along the $$\frac{N_i - 4}{N_i}(V'_i - V_i)$$
Figure 19B:
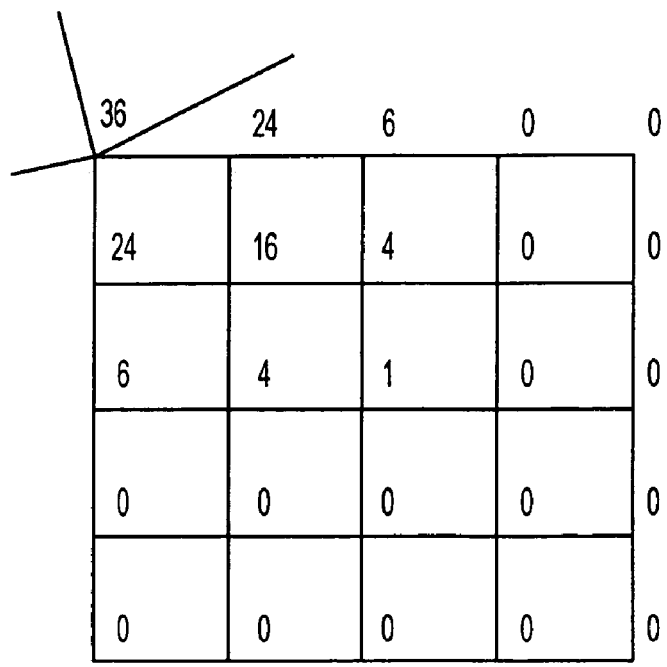

FIGS. 19A and 19B illustrate Catmull-Clark correction weights of the first two operations, along the $$\frac{N_i - 4}{N_i}(V_i' - V_i)$$

vector. Weights in the right image should be divided by 64. More precisely, this correction never propagates further than two rings of faces around the extraordinary vertex as shown in FIGS. 19A and 19B.

In addition, the corrections are only noticeable in the first couple of subdivision operations. The first subdivision operation produces the most visible change, which from Formula 11 is equal to $$C_i = \frac{N_i - 4}{N_i}(V_i' - V_i).$$

Subsequent subdivisions produce changes, $w_i C_i$, which are proportional to the first one by a weight $w_i$. It is possible to compute these weights exactly for the first couple of subdivision operations The Catmull-Clark result can be computed on a plane, with all points assigned a z value of 0, except for one. Then the rules described herein can be applied to the same plane, and the difference can be computed. This gives the contribution of that point. This operation can be repeated for each point in the plane. As all calculations are linear, the same weights apply to any objects. This is what was done in FIGS. 19A and 19B. These sampled weights then define a piecewise bilinear function on the unit square that can be used to compute the corresponding weight values when d is a power of two. For more general d values the weights can be interpolated from this function.

In practice, however, we found that a similar behavior can be achieved using the push-back operation described in the next section. The effect of the Catmull-Clark correction can be emulated by using a higher α value and by adjusting the β parameter. This is apparent in FIG. 17B, where a value $$\beta = \frac{1}{2}$$

produces a "rounded" spherical shape despite the fact that γ=0.

The push-back is similar to the d=2 case described above: we first compute the Δ values for the original vertices and then update the newly introduced vertices using bilinear interpolation. In a similar fashion we can use the normalized interpolation of the Δ values to keep the lengths equal.

For an even d, the push-back operation should be applied after Equations (23) and (24) have been applied. This is because it doesn't make sense to apply the push-back to the "intermediate" vertices $F_i$, which are used temporarily to compute the new vertex positions. To make the algorithm consistent for every number of divisions d, we prefer the algorithm to perform the push-back for odd d when Equation (22) is applied twice.

After some experimentation with higher order interpolation schemes we concluded that the differences were likely too small to prefer a more expensive interplant.

The present invention provides users with a simple smoothing tool for polygonal meshes. The smoothing operation allows users to create refined versions of their models. Crucial to the success of such a model is that the transitions between the different resolutions of the meshes are almost imperceptible.

In practice, we found that the new subdivision scheme of the present invention works best when we used a push-back operation with $$\alpha = \frac{1}{2}, \beta = \frac{1}{2} \text{ and } \gamma = 0.$$

Of course, these parameters should typically be set by the artist, who can freely explore the effect of varying the parameters to meet particular needs. Although this might be tricky, it is a huge improvement over current practice, where artists sometimes have to adjust individual vertices at each level of refinement. With the present invention, on the other hand, artists only have to worry about setting a few parameters at each level.

In another embodiment, the present methods described herein can also be applied to not just quadrilateral surfaces but also polygon surfaces with five sides or more.

FIG. 20A illustrates the subdividing process of an n-sided polygon. This method works with n≧4.

First, the process subdivides 2000 edges of the polygon into d pieces. This creates new vertices along each edge. This can be accomplished by using any method, including ones described herein.

After the subdivide operation 2000, then for each edge, the process joins the first vertices on the adjacent edges, creating new edges.

After the join operation 2002, the process then connects 2004 the remaining vertices (not the first vertices) to the new edges.

FIG. 20B illustrates an example of the subdividing process of an n-sided polygon using the process illustrated in FIG. 20A.

Original polygon 2006 is a four sided polygon to which we will apply the subdividing process of FIG. 20A.

After performing the subdividing operation 2000 (from FIG. 20A), the result is subdivided edge polygon 2008. Note here we have divided each (or edge) into three pieces, as new vertices are created.

Next the joining operation 2002 (from FIG. 20A) is performed, which results in the joined edge polygon 2010. Note for simplicity, only one edge is joined in FIG. 20B, although typically all edges of the polygon will be joined. New edge 2011 is a newly created edge.

Next, the connecting operation 2004 (from FIG. 20A) is performed, which results in the connected edge polygon 2012. Note that for simplicity, the connecting is only applied to one edge in FIG. 20B, although typically the connecting operation 2004 applies to all edges. Note that newly created points a 2014 and b 2016 are created, which are then connected to the subdivided points 2018 2020 on the outside edge. Newly created points a 2014 and b 2016 can be calculated in any manner. One way would be to maintain a one to one correspondence with the original points 2018 2020 as shown here. If the new edge 2011 is not the same length as the original edge, then points a and b may be computed to maintain the same ratio along the new edge 2011 as original points 2018 2020 maintain along the original edge. Numerous other connecting methods exist which could determine points a and b, and any of these methods can be applied, After the above-described operations are applied to all sides (edges) of a polygon, this leaves in the center an n-sided polygon (same n as original polygon) that should now be subdivided into d-2 pieces. Operations 2000, 2002, and 2004 are repeated until d=1 or d=0. In the case of the quadrilateral shown in FIG. 20b, since d=3 pieces, and d-2=1, the method is considered complete and no repeating is necessary.

FIG. 21A illustrates the subdividing process of an n-sided polygon as applied to a square, with d=6. An outside part 2100, a middle part 2102, and a center part 2104 represent each different iteration of the process being applied.

FIG. 21B illustrates the subdividing process of an n-sides polygon as applied to a pentagon, with d=4. An outside part 2106 and a center part 2108 represent each different iteration of the process being applied.

FIG. 21C illustrates the subdividing process of an n-sides polygon as applied to a pentagon, with d=5. An outside part 2110 and a center part 2112 represent each different iteration of the process being applied.

FIG. 21D illustrates the subdividing process of an n-sides polygon as applied to a hexagon, with d=6. An outside part 2114, a middle part 2116, and a center part 2118 represent each different iteration of the process being applied.

In a further embodiment, the present methods can by applied to a collection of polytopes of arbitrary dimension. A polytope is a known math term and is a generalization of a polygonal mesh to arbitrary dimensions. For example in three dimensions, a polytope is a collection of closed polyhedra, where a polyhedron is a solid whose boundary is a closed polygonal mesh. In general, a k-dimensional polytope is defined recursively in terms of a collection of simple polytopes whose boundaries are (k-1)-dimensional closed polytopes.

In this embodiment, every polytope is first linearly subdivided into smaller polytopes and then smoothed as follows. Each vertex of the polytope is replaced by the centroid of the polytope defined by the centroids of the polytopes adjacent to the vertex. Alternatively, every polytope can be subdivided and then the vertices are smoothed by replacing them by the average of all centroids of the neighboring polytopes. The positions of the vertices of the polytopes can also be adjusted as described herein. Each of these individual operations applied to polytopes may be accomplished by conventional methods and/or using the methods described herein which can simply be applied to k-dimensional polytopes.

FIG. 22A Illustrates a standard linear subdivision operation for cubes. Original cube 2200 is subdivided into a subdivided cube 2202, which comprises 8 smaller cubes. FIG. 22B illustrates a standard linear subdivision operation for tetrahedra. Original tetrahedron 2204 is subdivided into a subdivided tetrahedron 2206, which comprises 8 smaller tetrahedra.

FIG. 23 illustrates an example of linear subdivision of a 3D polytope. Original polytope 2300 is subdivided into a subdivided polytope 2302.

FIG. 24 is a block diagram illustrating one example of a configuration of hardware used to implement the present invention.

A display monitor 2400 is connected to a computer 2402. The computer performs the operational processes described herein based upon input from a keyboard 2406 and/or a mouse 2408. A drawing tablet 2404 can also be connected to the computer 2402. The computer 2402 has connected a ROM 2410, a RAM 2412, and a disk drive 2414. In addition, a drawing pen 2416 and/or a puck 2418 can also be used as input devices for the tablet. Of course, any applicable configuration of hardware can be used to implement the present invention.

The system can also include any type of conventional peripherals, including permanent or removable storage, such as magnetic and optical discs, etc. Further, any storage used with the computer (disk drive, RAM, etc.) can store the process and data structures of the present invention. The processes can also be distributed via, for example, downloading over a network such as the Internet.

The present invention has been described with respect to a general set of subdivision rules, which provide users with more control over the subdivision process.

This Application incorporates by reference the Article entitled, "A Unified Subdivision Scheme for Polygonal Modeling," by Jerome Maillot and Jos Stam, EUROGRAPHICS 2001, Volume 20 (2001), Number 3, published 9/2001. This Application also incorporates by reference the Article entitled, "On Subdivision Schemes Generalizing Uniform B-Spline Surfaces of Arbitrary Degree," by Jos Stam, Computer Aided Geometric Design 18(5), published June 2001.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the $$P_{di} := P_i^l \quad (1)$$

$$P_{di+k} := \frac{d-k}{d}P_i^l + \frac{k}{d}P_{i+1}^l, 0 < k < d \quad (2)$$

$$P_i := \frac{1}{d^2}\left(dP_i + \sum_{k=1}^{k<d}(d-k)(P_{i-k} + P_{i+k})\right) \quad (3)$$

$$\Delta_i := \alpha(P_i^l - P_{di}) \quad (4)$$

$$P_{di} := P_{di} + \Delta_i \quad (5)$$

$$P_{di+k} := P_{di+k} + \frac{d-k}{d}\Delta_i + \frac{k}{d}\Delta_{i+1} \; 0 < k < d \quad (6)$$

$$M = \begin{pmatrix} 2-2\alpha & 4(3+\alpha) & 2-2\alpha & 0 & 0 \\ -\alpha & 8+\alpha & 8+\alpha & -\alpha & 0 \\ 0 & 2-2\alpha & 4(3+\alpha) & 2-2\alpha & 0 \\ 0 & -\alpha & 8+\alpha & 8+\alpha & -\alpha \\ 0 & 0 & 2-2\alpha & 4(3+\alpha) & 2-2\alpha \end{pmatrix}\begin{pmatrix} P_{2i-2} \\ P_{2i-1} \\ P_{2i} \\ P_{2i+1} \\ P_{2i+2} \end{pmatrix} = \frac{1}{16}M \cdot \begin{pmatrix} P_{i-2}^l \\ P_{i-1}^l \\ P_i^l \\ P_{i+1}^l \\ P_{i+2}^l \end{pmatrix} \quad (7)$$

$$N_i = \varepsilon(V_i)^{\#} \quad (8)$$

-continued $$V_i := \frac{1}{4}V_i + \frac{1}{2N_i}\sum_{P \in \varepsilon(V_i)} P + \frac{1}{4N_i}\sum_{P \in C(V_i)} P \quad (9)$$

$$V_i := \frac{N_i - 3}{N_i}V_i + \frac{2}{N_i^2}\sum_{P \in \varepsilon(V_i)} P + \frac{1}{N_i^2}\sum_{P \in C(V_i)} P \quad (10)$$

$$\delta_i = \left(\frac{4}{N_i} - 1\right)V_i + \frac{N_i - 4}{N_i}V_i^l \quad (11)$$

$$= \frac{N_i - 4}{N_i}(V_i^l - V_i) \quad (12)$$

$$V_i := V_i + \gamma\delta_i \quad (13)$$

$$\Delta(V_i) = \alpha(V_i^l - V_i) \quad (14)$$

$$\Delta(E_i) = \frac{1}{2}(\Delta(V_0) + \Delta(V_1)) \quad (15)$$

$$\Delta(F_i) = \frac{1}{\varepsilon(F_i)^{\#}}\sum_{E_k \in \varepsilon(F_i)}\Delta(E_k) \quad (16)$$

$$= \frac{1}{C(F_i)^{\#}}\sum_{V_k \in C(F_i)}\Delta(V_k) \quad (17)$$

$$l(E_i) = \beta\frac{\|\Delta(V_0)\| + \|\Delta(V_1)\|}{2\|\Delta(E_i)\|} + 1 - \beta \quad (18)$$

$$l(F_i) = \beta\frac{\sum V_k \in \varepsilon(F_i)\|\Delta(V_k)\|}{\varepsilon(F_i)^{\#}\|\Delta(F_i)\|} + 1 - \beta \quad (19)$$

$$\Delta(E_i) := l(E_i)\Delta(E_i) \quad (20)$$

$$\Delta(F_i) := l(F_i)\Delta(F_i) \quad (21)$$

$$V_i := \frac{1}{\mathcal{V}_k(V_i)^{\#}}\sum_{V_j \in \mathcal{V}_k(V_i)} V_j \quad (22)$$

$$F_i := \frac{1}{\mathcal{V}_k(F_i)^{\#}}\sum_{j \in \mathcal{V}_k(F_i)} V_j \quad (23)$$

$$V_i := \frac{1}{\mathcal{F}_k(V_i)^{\#}}\sum_{j \in \mathcal{F}_k(V_i)} F_j \quad (24)$$

What is claimed is:

1. A method, comprising:
   subdividing a surface having original vertices at a first subdivision level producing additional vertices at a second subdivision level different from the first subdivision level;
   smoothing the surface into smoothed vertices comprising smoothed original vertices and smoothed additional vertices from the different first and second subdivision levels; and
   automatically adjusting positions of the smoothed vertices of the second subdivision level based on differences between the first and second levels.

2. A method as recited in claim 1, wherein the adjusting corrects distortion caused by the smoothing.

3. A method as recited in claim 1, wherein the adjusting further comprises determining actual displacements between the original vertices and the smoothed original vertices.

4. A method as recited in claim 2, wherein the adjusting further comprises determining interpolated displacements between the additional vertices and the smoothed additional vertices.

5. A method as recited in claim 3, wherein during the adjusting operation the smoothed original vertices are moved based on their actual displacement, and the smoothed additional vertices are moved based on their interpolated displacement.

6. A method as recited in claim 4, wherein during the adjusting operation, a distance the smoothed vertices are moved is weighted by a preset parameter.

7. A method as recited in claim 5, wherein during the adjusting operation, the interpolated displacements are weighted by a renormalization factor.

8. A method as recited in claim 6, wherein the renormalization factor results in bulging flat areas around face centers of a surface comprised by the smoothed vertices.

9. A method as recited in claim 1, wherein during the adjusting operation, a distance the smoothed vertices are adjusted is weighted by a preset parameter.

10. A method, comprising:
subdividing a surface having original vertices at a first subdivision level producing additional vertices;
smoothing the surface into smoothed vertices comprising smoothed original vertices and smoothed additional vertices at a second subdivision level different from the first subdivision level;
determining actual displacements between the original vertices and the smoothed original vertices of the different first and second subdivision levels;
determining interpolated displacements between the additional vertices and the smoothed additional vertices of the different first and second subdivision levels;
moving the smoothed original vertices of the first subdivision level by a distance based on the actual displacements;
moving the smoothed additional vertices of the second subdivision level by a distance based on the interpolated displacements,
wherein distances the smoothed vertices are moved are weighted based on a preset parameter, and
wherein the determined interpolated displacements are weighted by a renormalization factor which bulges flat areas around face centers of a surface comprised by the smoothed vertices.

11. A method, comprising:
determining displacements between points of a base mesh and corresponding smoothed points of a smoothed subdivided surface based on the base mesh of different first and second subdivision levels; and
moving the smoothed points of the second subdivision level based on differences between the first and second levels to adjust for distortion produced by the smoothing.

12. A method as recited in claim 11, further comprising weighting the moving operation by a preset volume parameter.

13. A method of reducing distortion in a smoothed subdivided vertex curve, comprising:
adjusting positions of vertices of the second subdivision level based on differences between the first and second levels in the smoothed subdivided vertex surface to compensate for distortion produced by prior subdividing and smoothing.

14. A method of subdividing surfaces using a base mesh comprising triangles and quadrilaterals, comprising:
creating a base mesh for a subdivision surface simultaneously comprising triangles and quadrilaterals;
subdividing the base mesh into a subdivision surface of different first and second subdivision levels comprising a mix of triangles and quadrilaterals;
smoothing the surface into smoothed vertices comprising smoothed original vertices and smoothed additional vertices from the different first and second subdivision levels; and
adjusting the surface of the second subdivision level based on differences between the first and second levels.

15. A method, comprising:
selecting an arbitrary number of faces not being a power of 4;
creating a subdivision surface of different first and second subdivision levels by subdividing a quadrilateral into the selected number of faces;
smoothing the surface into smoothed vertices comprising smoothed original vertices and smoothed additional vertices from the different first and second subdivision levels; and
adjusting the surface of the second subdivision level based on differences between the first and second levels.

16. A method, comprising:
creating a base mesh for a subdivision surface comprising triangles and quadrilaterals;
creating a subdivision surface of different first and second subdivision levels by subdividing the triangles and the quadrilaterals of the base mesh into an arbitrary number of faces not being a power of 4;
smoothing the surface into smoothed vertices comprising smoothed original vertices and smoothed additional vertices from the different first and second subdivision levels and
adjusting the surface of the second subdivision level based on differences between the first and second levels.

17. A method, comprising:
subdividing a surface into d pieces of different first and second subdivision levels;
smoothing the subdivided surface of the different first and second subdivision levels using a $[1\ 2\ \ldots\ d\ \ldots\ 2\ 1]$ smoothing mask; and
linearly interpolating push-back vectors for the smoothed subdivided surface of the second subdivision level based on differences between the first and second levels.

18. A method, comprising:
subdividing a five or more sided polygoned surface into a subdivided surface of different first and second subdivision levels;
smoothing the subdivided surface of the different first and second subdivision levels; and
adjusting positions of vertices of the smoothed subdivided surface of the second subdivision level based on differences between the first and second levels.

19. A method, comprising:
subdividing a polytope surface of dimension 3 or higher into a subdivided surface of different first and second subdivision levels;
smoothing the subdivided surface of the different first and second subdivision levels; and
adjusting positions of vertices of the smoothed subdivided surface of the second subdivision level based on differences between the first and second levels.

20. A computer readable storage, controlling a computer by:

subdividing a surface having original vertices at a first subdivision level producing additional vertices at a second subdivision level different from the first subdivision level;
smoothing the surface into smoothed vertices comprising smoothed original vertices and smoothed additional vertices from the different first and second subdivision levels; and
adjusting positions of the smoothed vertices of the second subdivision level based on differences between the first and second levels.

21. A computer readable storage as recited in claim 20, wherein the adjusting corrects distortion caused by the smoothing.

22. An apparatus, comprising:
a subdividing unit subdividing a surface having original vertices at a first subdivision level producing additional vertices at a second subdivision level different from the first subdivision level;
a smoothing unit smoothing the surface into smoothed vertices comprising smoothed original vertices and smoothed additional vertices from the different first and second subdivision levels; and
an adjusting unit adjusting positions of the smoothed vertices of the second subdivision level based on differences between the first and second levels.

23. An apparatus as recited in claim 22, wherein the adjusting unit corrects distortion caused by the smoothing.

24. A method of subdividing a surface having original vertices and composed of triangle faces and quadrilateral faces, comprising:
performing a linear subdivision of the surface having the original vertices and producing additional vertices where a number of previously presented faces for each subdivided face can be a number other than four;
centroid averaging the vertices producing smoothed vertices;
determining locational differences between smoothed vertices and corresponding original and additional vertices;
linearly determining displacement vectors for the differences; and
repositioning the smoothed vertices responsive to the differences, the vectors, a volume parameter having values different from zero and one, and a rounding parameter having a value other than one.

25. A method of subdividing a surface having original vertices and composed of triangle faces and quadrilateral faces, comprising:
performing a linear subdivision of the surface having the original vertices and producing additional vertices where a number of previously presented faces for each subdivided face can be a number other than four;
centroid averaging the vertices producing smoothed vertices;
determining locational differences between smoothed vertices and corresponding original and additional vertices;
linearly determining displacement vectors for the differences; and
repositioning the smoothed vertices responsive to the differences, the vectors and a volume parameter having values different from zero and one.

26. A method, comprising:
subdividing a surface having original vertices producing additional vertices;
smoothing the surface into smoothed vertices comprising smoothed original vertices and smoothed additional vertices; and
adjusting positions of the smoothed vertices responsive to a volume parameter having values different from zero and one.

27. A method, comprising:
subdividing a curved surface having original vertices producing additional vertices;
smoothing a curve of the curved surface into smoothed vertices comprising smoothed original vertices and smoothed additional vertices; and
adjusting positions of the smoothed vertices responsive to a volume parameter having values different from zero and one.

* * * * *

UNITED STATES PATENT AND TRADEMARK OFFICE
CERTIFICATE OF CORRECTION

PATENT NO. : 7,227,545 B2
APPLICATION NO. : 10/153888
DATED : June 5, 2007
INVENTOR(S) : Jerome Maillot et al.

It is certified that error appears in the above-identified patent and that said Letters Patent is hereby corrected as shown below:

Column 1, Line 40, change "102," to --102.--

Column 1, Line 40, change "the" to --The--.

Column 3, Line 22, change "polygon." to --polygon;--.

Column 3, line 42, change "Illustrates" to --illustrates--.

Column 4, Line 26, change "respectively," to --respectively.--.

Column 7, Line 55, change "advantage" to --average--.

Column 8, Line 9, after "used to" insert --implement the--.

Column 8, Line 10, after "invention" insert --.--.

Column 8, Line 12, after "smoothing," insert --in--.

Column 9, Line 13, change "A#." to --$A^{#}$.--.

Column 9, Line 63, change "vertices." to --vertices:--.

Column 13, Line 57, change "2018 2020" to --2018 and 2020--.

Column 13, Line 60-61, change "2018 2020" to --2018 and 2020--.

Column 13, Line 64, change "2018 2020" to --2018 and 2020--.

UNITED STATES PATENT AND TRADEMARK OFFICE
CERTIFICATE OF CORRECTION

PATENT NO. : 7,227,545 B2
APPLICATION NO. : 10/153888
DATED : June 5, 2007
INVENTOR(S) : Jerome Maillot et al.

It is certified that error appears in the above-identified patent and that said Letters Patent is hereby corrected as shown below:

Column 13, Line 67, change "applied," to --applied.--

Signed and Sealed this

Eighteenth Day of December, 2007

JON W. DUDAS
*Director of the United States Patent and Trademark Office*